United States Patent

[11] 3,534,817

[72] Inventors Gordon O. Garis
Golden Valley, and
Raymond F. Roettger, Minneapolis,
Minnesota
[21] Appl. No. 694,539
[22] Filed Dec. 29, 1967
[45] Patented Oct. 20, 1970
[73] Assignee Ray Go, Inc.
Minneapolis, Minnesota
a corporation of Minnesota.

[54] SOIL WORKING AND CONDITIONING MACHINE
8 Claims, 7 Drawing Figs.

[52] U.S. Cl. .................................................. 172/4,
172/49, 172/59, 172/111, 172/484, 37/189
[51] Int. Cl. ...................................................... A01b 63/114,
A01b 33/06
[50] Field of Search ............................................ 172/49, 59,
799, 110, 111, 484, 4; 92/383, 261, 263, 358;
37/189, 190; 180/42

[56] References Cited
UNITED STATES PATENTS

| 416,880 | 12/1889 | Whitehead | 172/111X |
|---|---|---|---|
| 1,342,815 | 6/1920 | Ingram | 172/59 |
| 2,088,141 | 7/1937 | Royston | 172/111X |
| 2,272,603 | 2/1942 | Ellis | 180/42X |
| 2,394,771 | 2/1946 | Hill | 172/59X |
| 2,414,072 | 1/1947 | Taft | 172/111X |
| 2,510,779 | 6/1950 | Hancock | 172/111X |
| 2,522,308 | 9/1950 | Silva | 172/59X |
| 2,545,173 | 3/1951 | Shaw | 172/59X |
| 2,732,675 | 1/1956 | Smith et al. | 172/59X |
| 2,748,509 | 6/1956 | Brown et al. | 172/799 |
| 2,764,077 | 9/1956 | Pertics et al. | 172/59 |
| 3,136,371 | 6/1964 | Ray et al. | 172/4 |
| 3,205,642 | 9/1965 | Smith | 172/111X |

FOREIGN PATENTS

| 245,578 | 6/1963 | Australia | 172/59 |
|---|---|---|---|
| 1,215,302 | 11/1959 | France | 172/111 |

*Primary Examiner*—Robert E. Pulfrey
*Assistant Examiner*—Alan E. Kopecki
*Attorney*—Ira Milton Jones

ABSTRACT: A plurality of side-by-side cutting units rotate on upright axes and cut into and pulverize the soil over which the machine advances. The cutting units can be individually adjusted for depth of cut and are driven in opposite directions to disperse and mix the loosened soil transversely along the swath cut thereby. The cutting tines on each unit extend outwardly away from the wall of the drum that carries them. Automatically operated means maintains any desired depth of cut.

Patented Oct. 20, 1970
3,534,817
Sheet 1 of 6
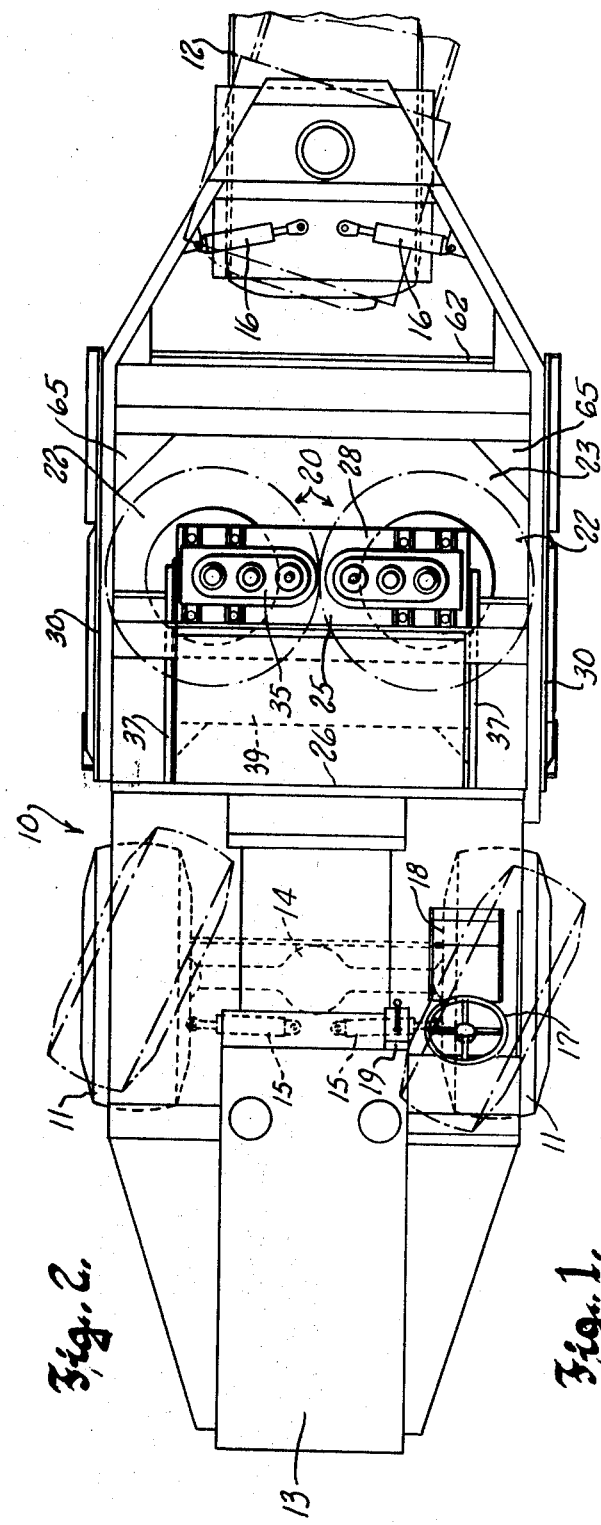
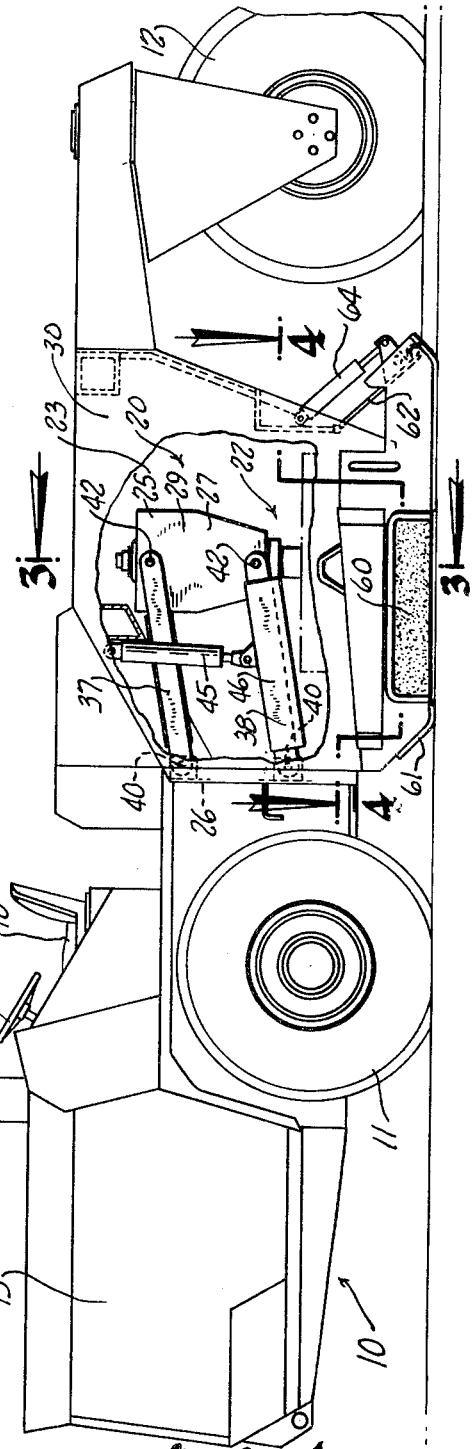
Inventors
Gordon O. Garis
Raymond F. Roettger

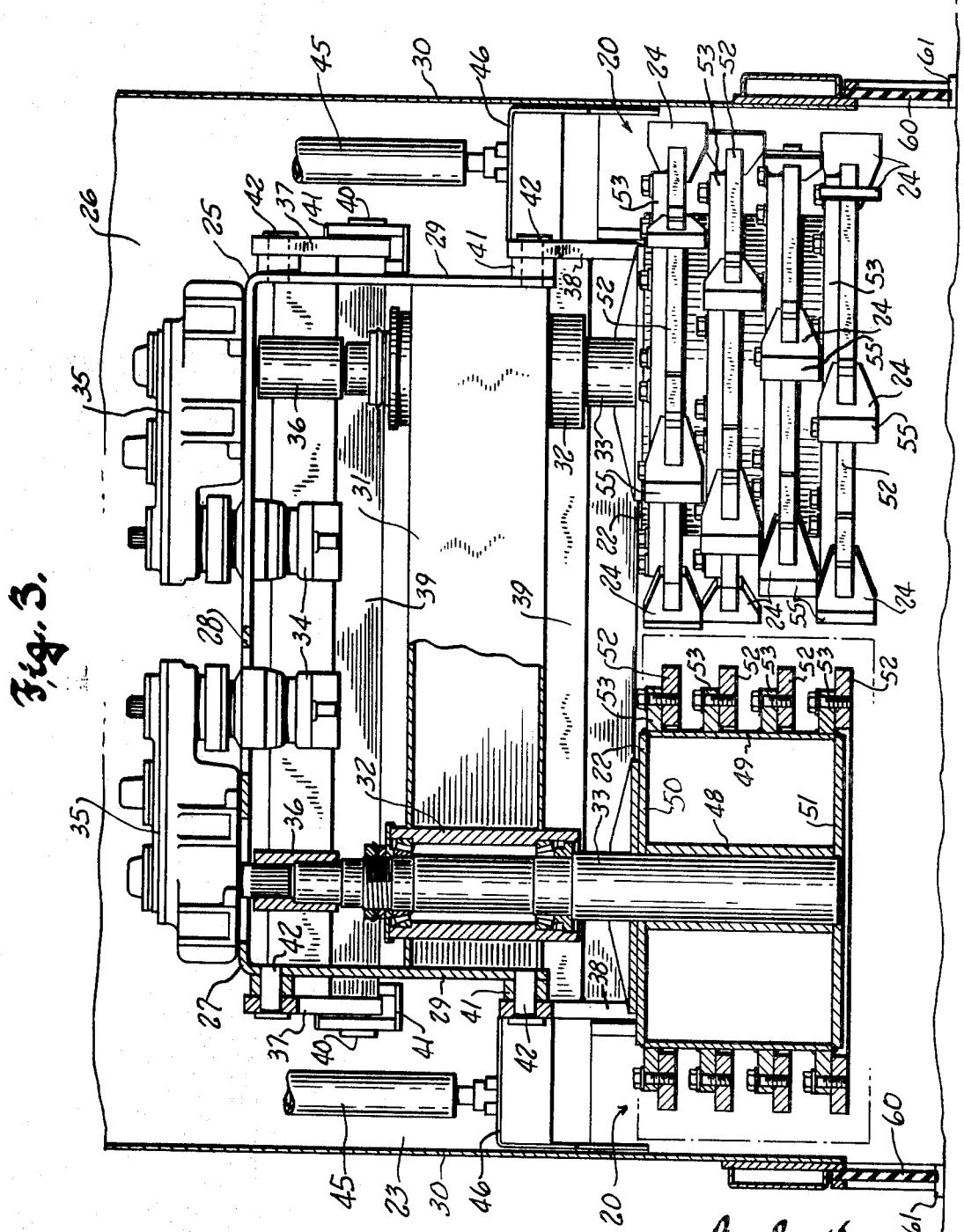

Patented Oct. 20, 1970

Inventors
Gordon O. Garis
Raymond F. Roettger

By Ira Milton Jones
Attorney

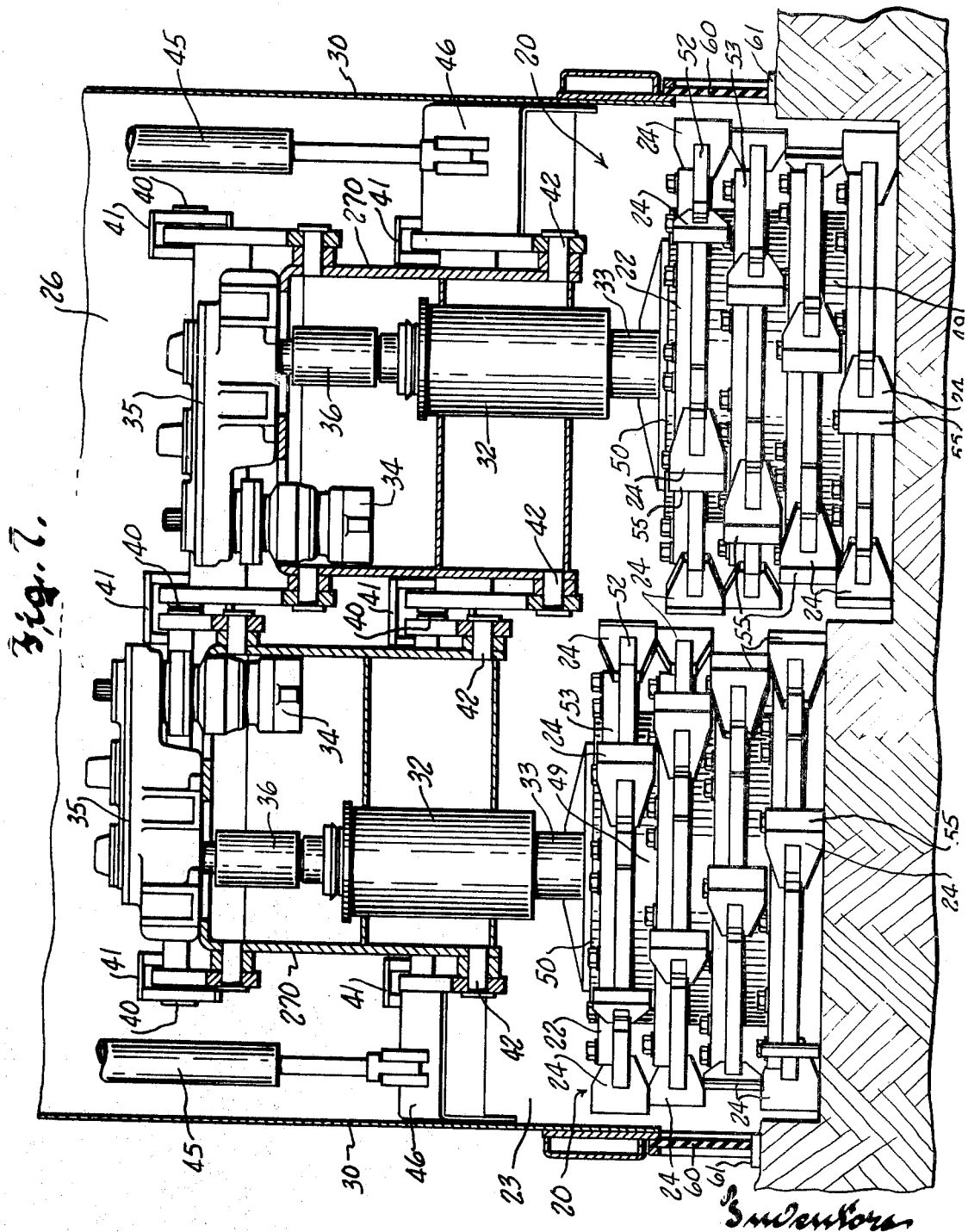

SOIL WORKING AND CONDITIONING MACHINE

This invention relates generally to road-making apparatus and has more particular reference to soil-working machines such as are used for pulverizing, mixing and conditioning soil in the production of a stable subgrade.

Machines of this type ordinarily comprise an elongated power-driven chassis and a tine-carrying rotor, usually mounted within and extending transversely across a hood or mixing chamber. The rotor is driven at substantial speed about a horizontal axis so as to cut into the soil over which a roadway is to be built and generally break up and mix the loosened soil during forward travel of the machine.

One of the main objectives of this invention is to provide a soil-working machine of the type referred to, but which achieves a hitherto unattainable degree of pulverization and dispersion of the soil in the swath acted upon by the machine.

To this end, it is a purpose of the invention to provide in a soil-working machine of the character described, a plurality of cutting units that rotate on upright axes lying in spaced-apart planes parallel to the longitudinal axis of the machine, and which cutting units carry tines that project outwardly away from their axes of rotation to direct soil cut and loosened thereby transversely of the swath acted upon by the cutting units.

More specifically, it is a purpose of the invention to provide a soil-working machine with upright, side-by-side rotary cutting units that operate in a mixing chamber and are driven in opposite directions with the tines travelling forwardly in adjacent portions of their orbits, and then outwardly toward the opposite sides of the mixing chamber. Driving the upright cutting units in this fashion not only minimizes the resistance which the rotating cutting units offer to forward propulsion of the machine during operation thereof, but in addition produces complete dispersal of the soil loosened by the tines transversely back and forth and assures uniform admixture thereof across the full width of the swath cut by the machine. This obviates the need for additional power-driven mixing or dispersing means following the cutting units, such as were necessitated by the horizontal orientation of the cutting units in past soil-working machines.

Another object of the invention resides in the provision of a mixing chamber in which the rotary cutting units operate, having opposite side wall panel oportions adjacent to the cutter orbits of resiliently flexible and yieldable material such as rubber, so as to allow passage of rocks and the like rearwardly around the cutting units rather than becoming jammed between their tines and the chamber side walls.

Still another 1S of the invention resides in the provision of a soil-working machine having upright cutting rotors that can be adjusted up and down for depth of cut either individually or in unison; and wherein instrumentalities including suitable sensing means is provided to automatically maintain the rotors at the elevation required to cut to any preselected or desired depth.

It is also an object of the invention to provide a soil-working machine having a power-driven chassis, wherein the wheels at both the front and the rear of the machine are steerable to enable it to travel along a straight path at an angle to the longitudinal axis of the chassis, to thereby dispose one of its rotary cutting units in partially trailing relation to another thereof, with the orbits of their tines partially overlapping with respect to said angular path of travel.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate two complete examples of the physical embodiment of the invention constructed according to the best modes so far devised for the practical application of the principles thereof, and in which:

FIG. 1 is a side elevational view of a soil-working machine embodying this invention, portions being broken away to show internal structure;

FIG. 2 is a plan view thereof;

FIG. 3 is a cross-sectional view taken on the line 3–3 in FIG. 1, and at an enlarged scale;

FIG. 7 is a view similar to FIG. 3 but illustrating a modified embodiment of the invention.

Figure 4:
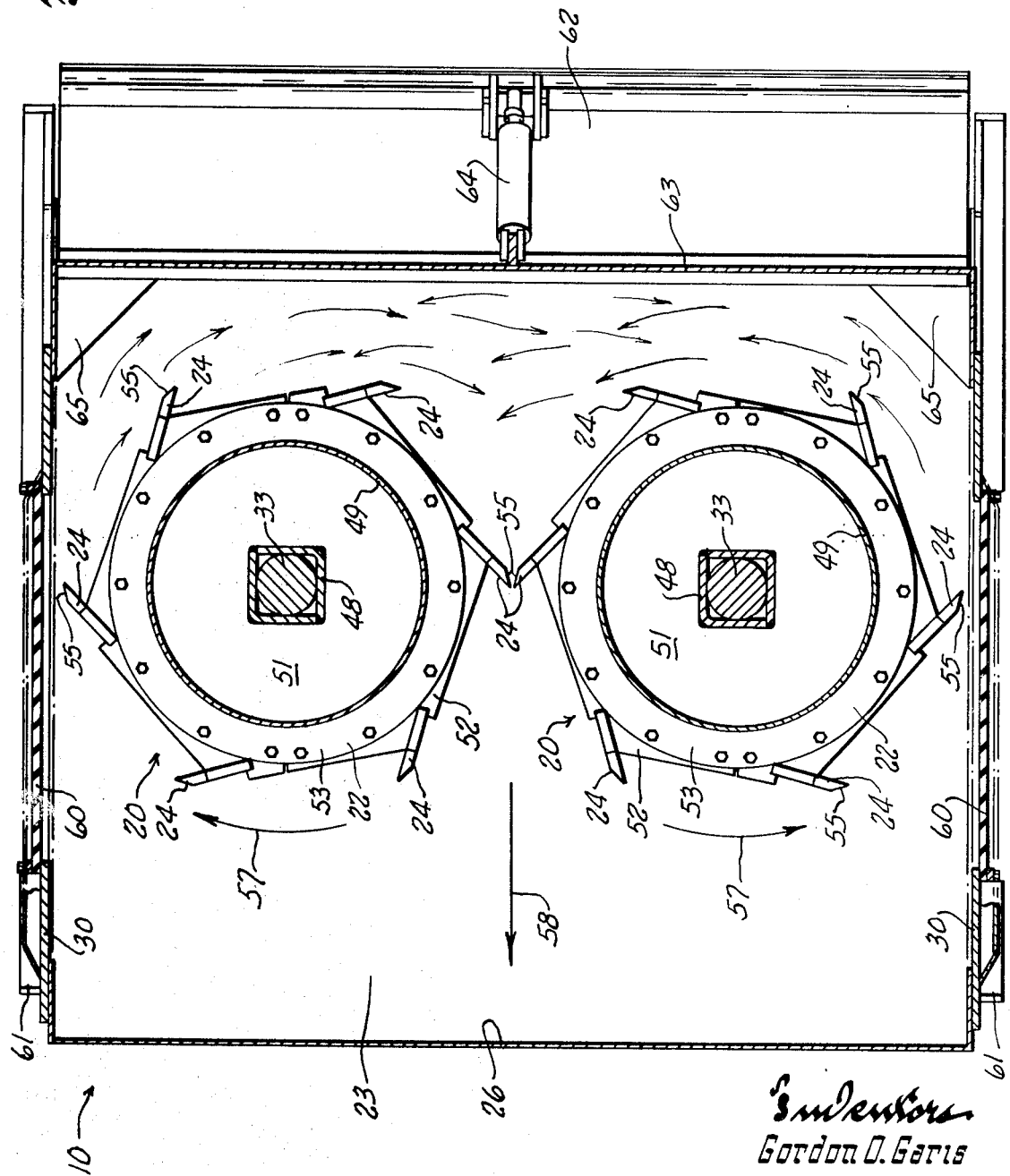
FIG. 4 is a sectional view taken on the line 4–4 in FIG. 1, and also at an enlarged scale.
Figure 5:
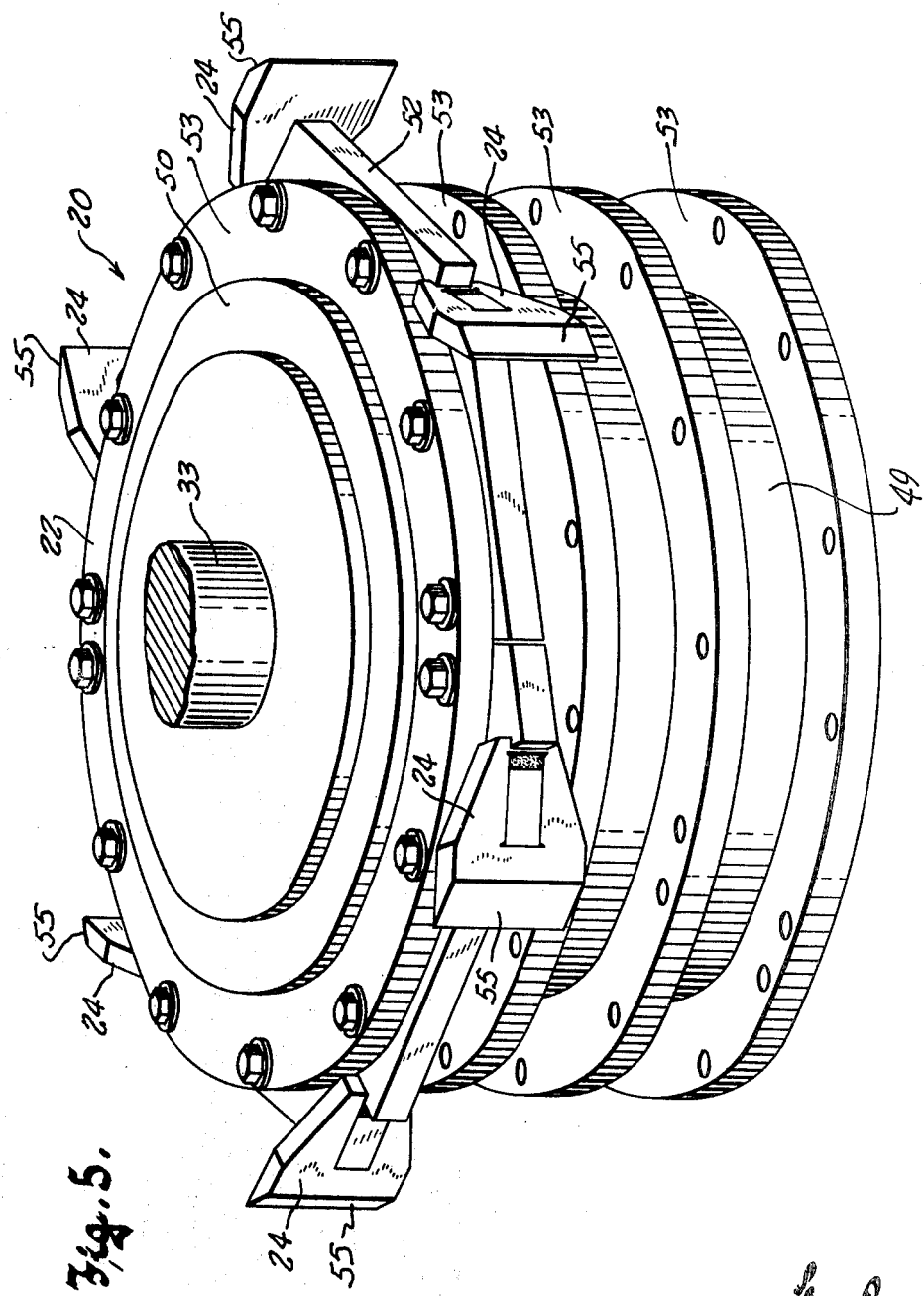
FIG. 5 is an enlarged fragmentary perspective view of a portion of one of the rotary cutting units.

Referring now to the accompanying drawings, the numeral 10 generally designates the elongated chassis of a soil-working and conditioning machine such as used in road construction, and which embodies this invention. The chassis includes a pair of steerable drive wheels 11 at the front of the chassis, and as here shown, a single rear wheel 12 located on the longitudinal axis of the chassis. Obviously a pair of transversely spaced rear wheels could also be provided, if desired, but it is a feature of the invention that both the front and rear wheels are steerable for better maneuverability and for other reasons to be discussed hereinafter.

The machine is powered by an engine, not shown, which is mounted on the front of the chassis in an engine compartment 13. The engine is drivingly connectable with the front wheels through suitable transmission means part of which is indicated at 14. The engine also drives a number of hydraulic pumps, not shown, that make pressure fluid available to fluid motors including steering cylinders 15 and 16 for the front and rear wheels, respectively, under the control of suitable hydraulic valves.

The valve for the front wheel cylinders is controlled by the steering wheel 17, which is mounted at the left front of the machine ahead of a drivers seat 18. The valve 19 for the cylinders governing steering of the rear wheel (or wheels) can be mounted on a console within easy reach of a driver occupying the seat 18, along with suitable drive and depth controls for the rotary cutting tool means 20 now about to be described.

Instead of the customary single soil-cutting rotor that extends transversely across the entire width of conventional machines, this invention provides a plurality of rotary cutting units 22, two such units being here shown by way of illustration. These units are mounted within a mixing chamber 23 located between the front and rear wheels, and they are supported from the chassis for rotation on upright axes lying in spaced-apart planes that are parallel to the longitudinal axis of the chassis. Each unit is provided with cutting elements or tines 24 that project outwardly away from the axis of rotation of the unit, as best seen in FIG. 3.

The two cutting units shown are mounted in side-by-side relation on supporting structure 25, which in turn is suspended from an upright wall 26 of the chasis that extends transversely thereacross at a location a short distance behind the front wheels 11 and provides the front wall of the mixing chamber 23. The supporting strtucture 25 can be made as a weldment comprising a rigid saddle 27 having a transversely extending horizontal top wall 28 and opposite legs 29 which are adjacent and parallel to the opposite side walls 30 of the mixing chamber. A beamlike member 31 also forming part of the weldment horizontally bridges the space between the lower portions of the legs 29 and carries the bearings 32 in which medial portions of the rotor shafts 33 are journaled for rotation on substantially vertical axes spaced apart transversely of the machine.

A pair of motors 34 mounted on the top wall 28 of the saddle provides for individually driving the rotor shafts. These motors can be of the hydraulic type, and they can be directly drivingly connected with the rotor shafts at their upper ends, or connected to the shafts by gear-type transmissions 35 as indicated, through couplings 36.

The supporting structure 25 is suspended from the transverse front wall 26 of the mixing chamber by parallelogram linkage comprising a pair of upper links 37 and a pair of lower links 38. The links of each pair thereof are rigidly joined by a substantially flat beamlike transverse member 39 that can be welded thereto. The forward ends of the links 37 and 38 are pivotally connected as at 40 to ears 41 fixed on the transverse wall 26, so that the links can swing up and down on spaced-apart horizontal axes extending crosswise of the chassis. The rear ends of the links are pivotally connected as at 42 to the saddle legs 29 with the upper and lower links in parallel relationship. Consequently, the entire supporting structure and the rotary cutting units 22 carried thereby can be moved vertically a distance sufficient to carry the tines on the cutting units from their inactive or transit positions seen in FIG. 3 at which the rotors are spaced a distance above ground level, to their lowermost working positions at which the tine carrying lower portions of the cutting units are substantially below ground level. Moreover, the parallelogram linkage enables up and down adjustments of the rotary cutting units to be effected without disturbing their vertical (or nearly vertical) orientation.

Such up and down motion can be readily imparted to the rotary cutting units by upright hydraulic cylinders 45, actuated in unison, and each operatively connected with one of the lower links through a force receiving pad 46 fixed to its outer side.

Each of the rotary cutting units 22 comprises a sturdy upright shaft 33, as mentioned hereinbefore, having its upper extremity projecting into a coupling 36, its medial portion rotably supported in one of the bearing structures 32, and a tine-carrying rotor on its lower end portion. The rotor comprises a substantially spool-shaped drum having a tubular inner wall 48 which is telescoped over and fixed to the lower end portion of the rotor shaft, a cylindrical outer wall 49 concentric to the shaft axis and of substantially large diameter, and top and bottom or end walls 50 and 51 respectively.

In the units shown, each of four groups of tines 24, six angularly equispaced tines 24 to the group, is supported from the outer wall 49 of the drum by a flange like carrier 52 that is readily detachably bolted to the underside of a ring 53 edgewise encircling and welded to the drum. The axial dimension of the drum is equal to about one-third the length of the rotor shaft, and the four rings 53 are fixed to the exterior of the drum wall 49 with equal spaces therebetween and with the endmost rings adjacent to the top and bottom walls of the drum. Each carrier flange 52 is preferably made in two complementary diametrical halves as shown, to facilitate attachment to and detachment thereof from its mounting ring 53.

The cutting elements or tines 24 comprise flat bars each having a wide chisel-shaped leading end portion 55 to cut into the soil as the rotor rotates. The tines of each group are angularly offset with respect to the tines of an adjacent group, and the orbits of the tines on each cutting unit are contiguious so that none of the soil is left between them during rotation of the unit.

The tines are readily detachably mounted on their carrier flanges 52 in a manner disclosed and claimed in the copending application of Dean B. Chenoweth, Ser. No. 698,685, filed Jan. 12, 1968 and assigned to the assignee of this application. It is sufficient to here note that the carrier 52 for each group of tines projects outwardly beyond the periphery of the ring 53 to which it is bolted, and has a substantially hexagonal shape when viewed in plan, as seen best in FIG. 4. One cutting element or tine 24 is located at each corner of the carrier, with the flat faces of the tine parallel to the rotor axis and substantially parallel to one side edge of the hexagonal carrier but spaced inwardly a slight distance therefrom. The cutting end portion of the tine projects outwardly away from the rotor axis and beyond the adjoining side edge of the carrier.

The spacing of the rotor shafts and the diameters of their drums are such that the cutting edges of the tines travel in orbits that are closely adjacent to one another and to the opposite side walls 30 of the mixing chamber, as seen best in FIG. 4.

It is also an important feature of the invention that the directions in which the cutting units are driven by their motors 34 are such that the tines on the two units travel forwardly in the adjacent portions of their orbits and then outwardly toward the side walls of the mixing chamber, as indicated by the arrows 57 in FIG. 4. Thus, as the tines cut into the soil during forward travel of the machine in the direction of the arrow 58 in FIG. 4, they move the loosened soil transversely in opposite directions toward and rearwardly past the side walls of the mixing chamber to the rear portion thereof, where much of the soil is again moved transversely inwardly away from the chamber side walls. A considerable degree of pulverization takes place during such back and forth movement of the soil transversely across the swath cut by the machine, and some of the soil will be transferred from the tines of one cutting unit to those of the other in the rear portion of the chamber as the tines begin to move forwardly in their orbits. Uniform admixture and distribution of pulverized soil throughout the entire width of the swath cut by the rotors is thus effected.

This invention also provides assurance against rocks and other large chunks of solid material becoming jammed between the rotor tines and the opposite side walls of the mixing chamber. For that purpose, each of the chamber side walls is provided with a panel 60 of resiliently yieldable and flexible material such as rubber, alongside the adjacent rotor. Stones or rocks and the like can forcefully impinge these panels without damaging them, and because of the flexibility of the panels larger rocks can be readily forced past them by the rotating tines.

During operation of the machine, runners 61 on the bottom portions of the side walls of the mixing machine and a tail flap 62 which is hingedly connected to the lower edge of the rear wall 63 of the mixing chamber ride on the ground to confine the loose soil as it is being acted upon by the rotors, and by adjusting the angle of the tail flap by means of a hydraulic ram 64, the pulverized soil is "struck-off" at the desired level. For nonworking travel of the machine from one location to another, the runners 61 and the tail flap can be elevated to clear the ground.

Angular deflectors 65 in the rear corners of the mixing chamber, seen best in FIG. 4, serve to facilitate the mixing action described above.

If desired, the cutting units 22 can be mounted for individual vertical adjusting motion in the manner seen in FIG. 7. This merely involves the provision of separate saddles 270 for the cutting units and parallelogram linkage such as described for each saddle. The cylinders 45, in this case, are separately controlled so as to enable one rotary cutting unit to operate at a deeper level than the other. This can be especially advantageous where one rotor is operating on a roadbed and the adjacent rotor is operating at a higher level on soil which is to become the shoulder at one side of the subgrade.

Figure 6:
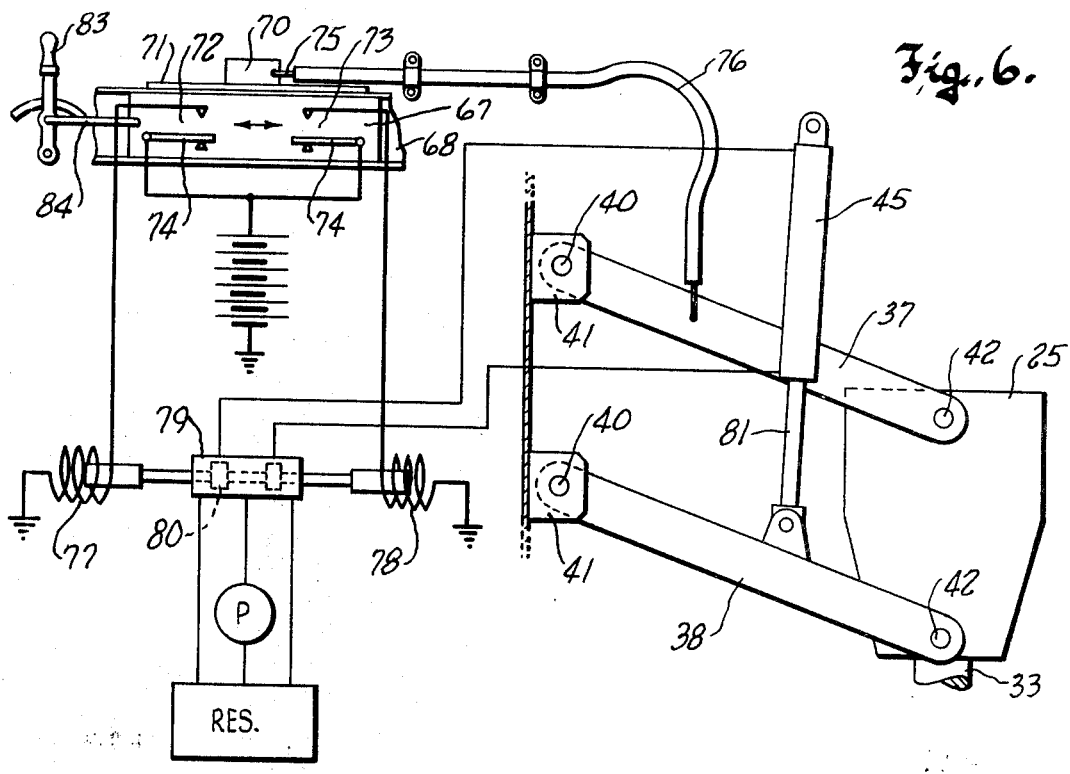
FIG. 6 is a diagrammatic view illustrating the instrumentalities for maintaining the rotary cutting units at a selected depth.

This invention also provides simple but efficient instrumentalities for controlling operation of the double acting cylinders 45 so as to automatically maintain the rotary cutting units at different predetermined depths during operation of the machine. As illustrated more or less schematically in FIG. 6, these instrumentalities comprise a switch unit 67 mounted in an elongated guide 68 which is fixed to the chassis of the machine, so that the switch unit can be set in any desired position of adjustment lengthwise of the guide. They also comprise a permanent magnet 70 which is slidable back and forth on the guide, lengthwise thereof.

If the guide is made of nonmagnetically permeable material, the magnet can be supported directly thereon. A thin sheet 71 of nonmagnetically permeable material is interposed between the magnet and the guide if the latter is made of magnetically permeable material.

The switch unit comprises two normally open reed switches 72 and 73 which are space apart lengthwise of the guide and have magnetically attractable contactors 74 which lie outside the sphere of influence of the magnet when the latter is disposed midway between the switches, in its position shown. The magnet is operatively connected by a push-pull cable 75 to one of the links 37 of the parallelogram linkage by which the rotary cutting assemblies are suspended from the chassis. The sheath 76 of the cable, of course, is anchored to the chassis of the machine.

Assuming that the cutting units are set to operate at a predetermined depth, up and/or down migration of the units from that depth will be inevitable due to leakage of hydraulic fluid in one direction or the other past the pistons in cylinders 45, under the influence of varying load forces on the cutting units. Such migration of the cutting units will cause the magnet 70 to move correspondingly to the right or to the left from its centered position to an active position at which it attracts the contactor 74 of one or the other of the reed switches to its closed position. Closure of one of the switches effects energization of one of the solenoids 77 or 78 governing operation of a hydraulic control valve 79 for the cylinders 45 connecting with the lower links 38 of the parallelogram linkage, to activate the cylinders and cause them to move the cutting units back to the desired depth.

Closure of the switch 72, for example, completes an energizing circuit for solenoid 77 and causes the valve element 80 of the control valve to be shifted to the left out of a spring-centered hold position, to connect the upper ends of cylinders 45 with the pump P and the lower ends of the cylinders with the reservoir. Closure of switch 73 effects energization of solenoid 78 and response of the valve element 80 in the opposite direction to reverse these connections between the cylinders and the pump and reservoir. In other words, the work-performing elements 81 of cylinders 45 are extended when the magnet 70 is shifted to the left to attract the contactor 74 of switch 72 to its closed position; and the work performing elements are retracted whenever the magnet is shifted to the right to effect closure of switch 73.

In either case, the cylinders are rendered operative for only as long as it takes the magnet 70 to be returned to its centered position shown, at which either switch that had been closed will again open.

Adjustment of the cutting units to a new depth setting is readily accomplished merely by adjusting the position of the switch unit relative to the magnet 70. An operating lever 83 on the machine at a location readily accessible to the operator, is provided for this purpose. The lever is connected to the switch unit through a link 84.

Thus, for example, if it is desired to set the cutting units for operation at a greater depth, the lever 83 is actuated to shift the switch unit to the right relative to the magnet 70, and thereby effect magnetic attraction of the contactor of switch 72 to its closed position. Pressure fluid is then directed into the tops of the cylinders to lower the cutting units to the degree depending upon the extent the switch unit was shifted. Lowering motion of the cutting unit ceases as soon as the magnet is carried to a new position centered with respect to the two reed switches. The cutting units can be raised to transit positions clear of the ground, of course, in consequence of manual shifting of the switch unit to the left.

It will be obvious that connection of the magnet 70 with the hand lever 83 and connection of the switch unit with the parallelogram linkage would produce the same results as described above.

It may be desirable at times to operate the machine with its steerable front and rear wheels turned in the same direction, for example to positions indicated in broken lines in FIG. 2. This will effect forward travel of the machine along a straight path but at an angle to the longitudinal axis of the chassis, in an attitude akin to that of an airplane when the latter is "crabbing". When the wheels are so adjusted, the machine will cut a swath narrower than during straight ahead travel, and one rotor will lead and partially overlap the orbit of the other. Somewhat more thorough pulverization will thus result because the tines on the leading rotor will direct more of the loosened soil behind it to the contrarotating tines on the trailing rotor.

From the foregoing description, together with the accompanying drawings, it will be apparent to those skilled in the art that this invention embodies several new concepts which significantly improve the operating characteristics of a soil-working and conditioning machine.

We claim:

1. A soil working machine having an elongated power-driven chassis with front and rear wheels and rotary cutting means for cutting into the soil during forward travel of the machine, said machine being characterized by:

A. a mixing chamber between the front and rear wheels,
   said mixing chamber having a front wall which constitutes a rigid part of the chassis and extends transversely thereof, and side and rear walls that are supported from the chassis, said side and rear walls extending downwardly to ride upon the soil during the soil-working operation;

B. said cutting means comprising a plurality of rotary cutting units, each having cutting elements which project outwardly away from the axis of the unit and which are arranged to travel in axially spaced orbits as the unit rotates;

C. parallelogram arms pivoted to the rigid front wall of the mixing chamber and extending rearwardly therefrom to have their rear ends movable up and down in the mixing chamber;

D. supporting structure for the cutting units connected to the rear ends of the parallelogram arms supporting the cutting units for up and down adjustment within the mixing chamber and for rotation with their axes upright and lying in substantially parallel planes spaced transversely of the chassis, and with the orbits of the cutting elements on adjacent units in close juxtaposition and the transversely outermost portions of the orbits of the cutting elements in close juxtaposition to the side walls of the mixing chamber;

E. means operatively connected between the chassis and said supporting structure to raise and lower the latter and thereby adjust the elevation of the cutting units within the mixing chamber; and F. drive means connected with the cutting units to drive adjacent units in opposite directions so that as the machine travels along the ground with the cutting units lowered, said cutting units cut into and loosen the soil and continuously work the loosened soil transversely in the mixing chamber.

2. The soil-stabilizing machine of claim 1, further characterized by:

A. there being a pair of said cutting units mounted in side-by-side relation to extend across the space between the opposite sides of the mixing chamber;

B. and said drive means imparting rotation to the cutting units in directions such that the cutting elements thereon move forwardly through the adjacent portions of their orbits and rearwardly in the portions of their orbits that are in juxtaposition to the side walls of the mixing chamber.

3. The soil-stabilizing machine of claim 2, further characterized by resiliently yieldable panel sections forming the portions of the mixing chamber side walls that are adjacent to the cutting units to yield under impact of rocks and other solid material thrown thereagainst by said cutting units whereby such material passes from the mixing chamber without jamming the cutting units.

4. The soil-working machine of claim 2, wherein the cutting units are directly opposite one another on a line normal to the longitudinal axis of the chassis and the orbits of their cutting elements are spaced apart only a slight distance to opposite sides of a line parallel to the longitudinal axis of the chassis and passing midway between the axes of the units, and wherein the front and rear wheels are steerable to provide for travel of the machine along a straight path at an angle to the longitudinal axis of the chassis so as to cause one cutting unit to lead the other, whereby the swath cut by the cutting units is narrower than it is when the path of the machine is parallel to its longitudinal axis, and whereby the cutting elements on the trailing unit act upon a substantial quantity of the soil cut by the elements on the leading unit.

5. The soil-working machine of claim 4, further characterized by:
   A. a separate drive motor for each cutting unit;
   B. and said parallelogram arms mounting the cutting units for individual up and down adjusting motion.

6. The soil-working machine of claim 5, further characterized by means connected between the chassis and each cutting unit for adjusting the height of the latter to obtain a selected elevation thereof.

7. A soil-working machine comprising an elongated power-driven chassis, and power-driven rotary cutting tool means for cutting into the soil during forward travel of the machine, characterized by:
   A. said cutting tool means comprising a pair of transversely adjacent rotary cutting units, each having cutting elements that project outwardly away from the axis of rotation of the unit;
   B. movable supporting structure supporting the cutting units from the chassis for up and down adjusting motion with their axes of rotation upright;
   C. reversible power-operated means connected between the chassis and said supporting structure for adjusting the latter to thereby obtain a selected depth of the cutting units with respect to the surface of the soil to be worked by the machine;
   D. control means for said power-operated means comprising instrumentalities for sensing the depth of the cutting units and for initiating operation of said power-operated means to effect adjustment of the depth of the cutting units upon departure from a selected depth, said control instrumentalities comprising:
      1. a switch element including a pair of normally open electric switches mounted at opposite sides of a neutral zone and each having a contactor which is magnetically attractable to a position closing its switch to effect operation of the power means in one direction;
      2. a permanent magnet element normally disposed in said neutral zone, for selectively attracting said contactors to their switch-closing positions in consequence of relative movement between said elements along a predetermined path to dispose the magnet closer to either contactor and farther from the other contactor; and
      3. means providing a motion-transmitting connection between one of said elements and said movable supporting structure by which such relative movement between the magnet and the switch unit is effected in consequence of movement of the supporting structure caused by up or down variation in the depth of the cutting tool means from the selected depth; and
   E. means for adjusting the position of the other of said elements along said path.

8. The soil-working machine of claim 7, further characterized by:
   A. said power-operated means comprising a double acting hydraulic cylinder;
   B. and said control means comprising a solenoid-operated reversing valve for said cylinder, the solenoids of which are selectively energizable by said electric switches.